United States Patent [19]

Hoelzl et al.

[11] 4,213,011

[45] Jul. 15, 1980

[54] PROCESS FOR T.D.M. FRAME SYNCHRONIZATION EMPLOYING VARIABLE SYNCHRONIZING WORDS

[75] Inventors: Ludwig Hoelzl, Sauerlach; Konrad Reisinger, Zorneding, both of Fed. Rep. of Germany

[73] Assignee: Siemens Aktiengesellschaft, Berlin & Munich, Fed. Rep. of Germany

[21] Appl. No.: 932,482

[22] Filed: Aug. 10, 1978

[30] Foreign Application Priority Data

Sep. 12, 1977 [DE] Fed. Rep. of Germany ....... 2740997

[51] Int. Cl.$^2$ .............................................. H04J 3/06
[52] U.S. Cl. ..................................... 370/100; 370/106
[58] Field of Search .................. 179/15 BS; 178/69.1; 325/38 R

[56] References Cited

U.S. PATENT DOCUMENTS

| | | | |
|---|---|---|---|
| 3,873,920 | 3/1975 | Apple et al. | 178/69.1 |
| 3,963,869 | 6/1976 | Caldwell | 179/15 BS |
| 4,012,589 | 3/1977 | Reisinger | 179/15 BS |
| 4,124,778 | 11/1978 | Amass | 179/15 BS |

*Primary Examiner*—Douglas W. Olms
*Attorney, Agent, or Firm*—Hill, Van Santen, Steadman, Chiara & Simpson

[57] ABSTRACT

A process for T.D.M. frame synchronization which employs variable length synchronizing word at the receiving end and wherein the transmitter produces signals which consist of groups each comprising p bits and one marker bit and in respect to each multiplex frame contains a total of m marker bits of which s marker bits form the synchronizing words and where at the transmitter $s-1$ marker bits determine the following s-th marker bit and wherein the transmitted signal is stored and $p+1$ addresses are produced which are periodically assigned to the p bits and marker bits of each group and at the receiver the $s-$th bit is obtained from $s-1$ bits stored and compared with the corresponding received bit of the T.D.M. signal and when identity occurs pulses having a similar address are counted and a frame synchronizing signal is emitted.

4 Claims, 7 Drawing Figures

PROCESS FOR T.D.M. FRAME SYNCHRONIZATION EMPLOYING VARIABLE SYNCHRONIZING WORDS

BACKGROUND OF THE INVENTION

1. Field of the Invention

This invention relates in general to apparatus and method for t.d.m. frame synchronization at the receiver employing variable synchronizing words and a transmitter produces a t.d.m. signal which consists of groups each consisting of p bits and one marker bit and each multiplex frame contains a total of m marker bits of which s marker bits in each case forms the synchronizing words and at the transmitter the following s-th marker bit is determined by s-1 marker bits and the transmitted signal is transmitted to the receiver and stored in a storage means wherein p+1 addresses are produced which are periodically assigned to the p bits and marker bits of each group and at the receiver the s-th bit is obtained from the s−1 bit stored in the storage means of the t.d.m. signal and compared with the corresponding received bit of the t.d.m. signal and in the vent of identity an identifying pulse is obtained and with successive identifying pulses having the same addresses are counted and depending upon the result of the counting a frame synchronizing signal is emitted with which the receiver t.d.m. frame is set up.

2. Description of the Prior Art

In known prior art processes, individual disturbed marker bits of variable synchronizing words can cause an already established frame synchronization to be thrown out of step and synchronization.

SUMMARY OF THE INVENTION

It is an object of the present invention to provide a process for accomplishing stable frame synchronization even when certain of the marker bits are disturbed.

The object of the present invention is realized in that in the non-synchronous state, the received t.d.m. signal is fed to a storage means and when synchronization has been achieved the pulses which occur during the addresses of the marker bits and are complimentary to the identity pulses are produced and in place of the t.d.m. signal the s-th bits obtained at the receiver are fed to the storage means for a time such that the number of complimentary pulses per multiplex frame is lower than a given number and the supply of the t.d.m. signal to the storage means is reintroduced when in the synchronous state the number of complimentary pulses per multiplex frame is greater than the given number.

The process of the invention is characterized by a stable mode of operation since once frame synchronization has been achieved, the marker bits stored in the storage means are subjected to less disturbances than the received marker bits of the t.d.m. signal. This is true particularly shortly after frame synchronization has been achieved as otherwise the frame synchronization would not have been accomplished.

The given number is on the one hand not too small so as to prevent randomly occurring disturbed marker bits causing the frame synchronization to go out of step and, on the other hand, the given number is not to be too high as otherwise when frame synchronization has been lost it would take a relatively long time to re-establish the synchronized condition. It is proven expedient for the given number to be in the range of at least m/20 and at the most m/5.

For practicing the invention, a circuit arrangement has proved valuable which comprises a receiver having a first pulse generator which produces a bit pulse train comprising a first address generator which produces demultiplex addresses for the control of the demultiplexer and wherein the receiver includes a synchronizing device which responds to the variable synchronizing words and resets the first address generator at the beginning of the t.d.m. frame and further comprises a plurality of buffer storage means which are controlled with the aid of a demultiplexer and by means of which individual bits of the t.d.m. signal are fed to corresponding data sinks.

The circuit arrangement at the receiving end comprises a synchronizing device which contains a second address generator which produces the p+1 addresses which occur approximately simultaneously to the individual bits of the t.d.m. signal and the synchronizing device contains an addressable storage means having p+1 storage blocks with first storage cells that can be connected by way of an first input and by way of an output and the further storage cells can be connected by way of further inputs and further outputs and a second pulse generator is provided which during the individual bits of the t.d.m. signal produces a binary read/write signal which relative to each bit establishes one write-in phase and one read-out phase of the storage means and an intermediate storage device is provided which has storage cells connected to further outputs of the addressable storage means. An allocator is provided which at its input is connected to the storage cells of the intermediate storage means and depending upon the s−1 bits of the t.d.m. signal emits the s-th bit. A switch is provided which depending upon a switching signal supplies the t.d.m. signal in a first switching position and the s-th bit of the allocator in a second switching position to the first input of the addressable storage means. The identifying pulses are produced with the aid of a comparator which at its input is fed on one hand with in each case one bit of the received t.d.m. signal and on the other hand with the s-th bit. A first counting device is provided which relative to each address counts the number of identify pulses and depending upon the count emits a switching signal which triggers the frame synchronizing signal and a second counting device is provided which when in the synchronous state is supplied with the complimentary pulses and emits a blocking signal which blocks the first counting device when the given number is exceeded.

The circuit arrangement is characterized by a comparatively low technical circuit outlay and by being very reliable during operation.

So as to use the allocator, not only to acquire the s-th bit, but also to produce the frame synchronizing signal it is expedient for the allocator to have a second output by means of which a marker signal is emitted whenever a marker bit combination signalling the beginning of a multiplexer frame is present at the input of the allocator and to provide an AND-gate which is supplied at its input with the marker bit signal and the switching signal and which emits the frame synchronizing signal.

In the following, a preferred exemplary embodiment of the invention will be described making reference to FIGS. 1 through 7 in which identical components appearing in several Figures are provided with like references.

DESCRIPTION OF THE PREFERRED EMBODIMENTS

Figure 1:
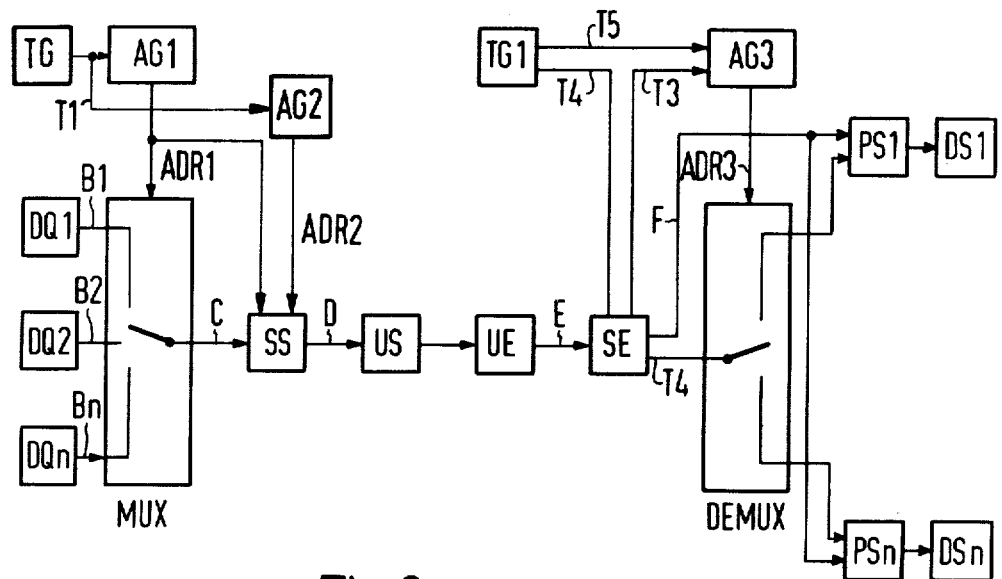
FIG. 1 illustrates a t.d.m. system.

FIG. 1 illustrates a t.d.m. system wherein at the transmitting site there are provided the sources DQ1 and DQn as well as the address generators AG1 and AG2. The pulse generator TG supplies inputs to the address generator AG1 and AG2 as well as an input to the multiplexer MUX. A synchronizing device SS receives the output of the address generators AG1 and AG2 as well as the output of the multiplexer MUX. A transmission device US receives the output of the synchronizing device SS. The signals B1 to Bn can occur in a given bit pattern and buffer storage means not illustrated can be provided so as to compensate for deviations in the data from this given bit pattern. The individual bits of the data sources DQ1 to DQn can be emitted with an identical bit rate but they also can be emitted with different bit rates. With each address of the address generator AG1, one of the signals B1 to Bn is switched through to the output of the multiplexer MUX and the addresses can be emitted in such a manner that the individual bits of the data sources are interleaved bit-wise or envelope-wise in the signal C. The pulse generator TG emits the timing signal T1 and, thus, controls the address generators AG1 and AG2. With the aid of the synchronizing device SS, marker bits are inserted into the signal C as can be seen when considering FIG. 2. The signal D is thus formed and is fed to the transmitter transmission device US and transmitted over a communication link to the receiver.

At the receiver of the system, a transmission device UE receives the incoming signal and supplies an output to the synchronizing device SE which receives an input from a pulse generator TG1 and supplies an output on line T4 to a demultiplexer DEMUX as well as to buffer storage means PS1. An address generator AG3 receives inputs from the synchronizing device SE and the pulse generator TG1 and supplies an input to the demultiplexer DEMUX. Buffer storage means PS1 through PSn are connected to the output of the demultiplexer DEMUX as well as to the output of the synchronizing device SE. Data sinks DS1 through DSn are connected to the buffer storages PS1 athrough PSn. The signal E emitted by the transmission device UE is substantially identical to the signal at the transmitter D. The two signals D and E or t.d.m. signals which, in addition to the individual interleaved bits of data sources also contain marker bits which form variable synchronizing words. Particularly, the synchronizing device SE is utilized to produce the frame synchronizing signal T3 which resets the address generator AG3 at the beginning of the t.d.m. frame so than the output of the addresses ADR3 is commenced. The addresses ADR3 are identical to the addresses ADR1 at the transmitter. The signal S which contains the data bits of the data sources is present at the inputs of the buffer storage means PS1 through PSn. With the aid of the demultiplexer DEMUX the timing signal T4 passes to individual buffer storage means which are thereby activated and receive the relevant bits of the signal S. By way of the outputs of these buffer storage means, these bits are forwarded to the data sinks DS1 and DSn. The pulse generator TG1 produces the timing signals T4 and T5 for the operation of the address generator AG3 and the synchronizing device SE.

Figure 2:
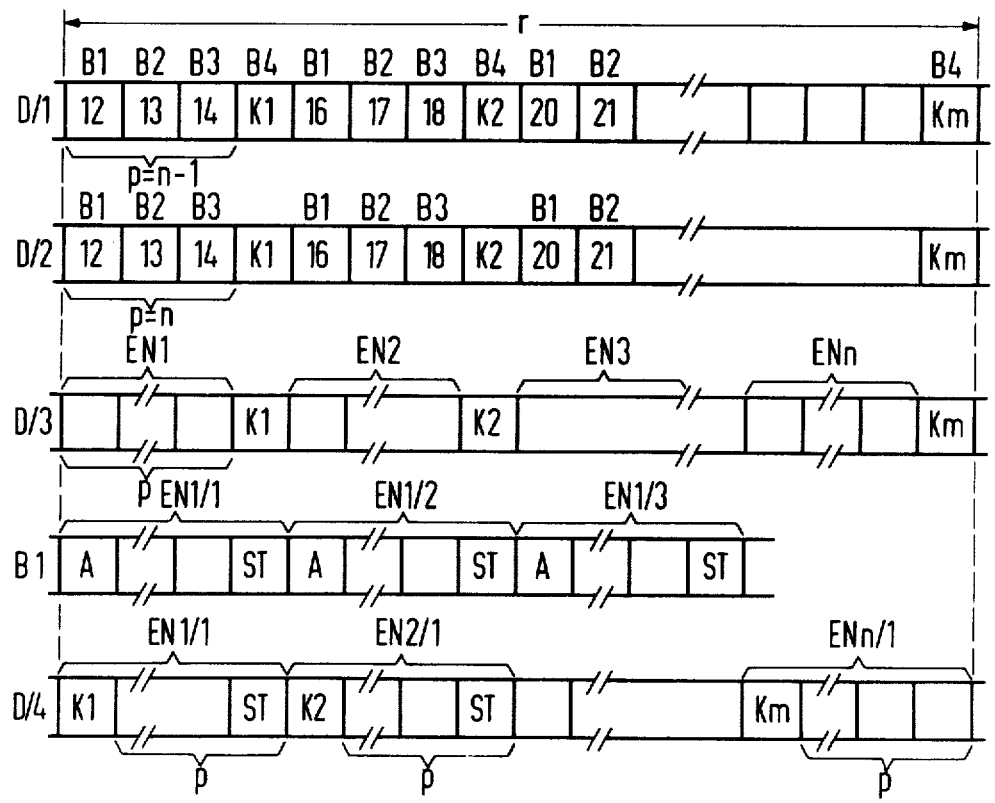
FIG. 2 illustrates variations of the t.d.m. signal occurring at the transmitter.

FIG. 2 illustrates embodiments D/1, D/2, D/3, D/4 comprising multiplex signals which can occur at the transmitter. A common feature of all the illustrated embodiments is that p bits are in each case followed by one of the marker bits K1, K2 ... Km. Within the pulse frame r, there will fall a total of m groups each comprising p+1 bits. The signals D/1 and D/2 utilize bit-wise interleaving. In signal D/1, it is assumed that the bits 12, 13, 14 and K1 originate in turn from a total of four data sources and thus form parts of the signal B1, B2, B3 and B4. The first group of the signal D/1 thus consists in the same way as all the further groups of four bits with the marker bits K1, K2 ... Km being supplied by a fourth data source. Thus, in this case, p=n-=3.

In the case of the illustrated signal D/2, only three bits which are the bits 12, 13, 14 and 16, 17 and 18, etc. originate from only three assumed data sources. The marker bits K1, K2 ... Km are interposed in the region of the synchronizing device SS. In this exemplary embodiments, p=n=3.

In the example of signal D/3, it is assumed that the data sources D/1 to DQn emit envelopes EN1, EN2, EN3 ... ENn each comprising p bits. Thus, each of the groups consist of p bits of the individual envelopes and one marker bit. Thus, the signal D/3 is interleaved envelope-wise and in this particular exemplary embodiment, m=n.

The signal B1 relates to a special embodiment of a signal composed of the envelopes EN1/1, EN1/2, EN1/3 ... Each envelope posses a so-called alignment bit A at the start and a so-called status bit ST at the end. In between the actual message bits are transmitted. For example, six message bits can be provided so that the individual envelopes are formed from a total of eight bits. The data signals of the other data sources can be formed in a similar manner from envelopes. Assuming data signals of this kind, the signal D/4 can be formed such that the marker bits K1, K2 ... Km are inserted in place of the alignment bits A. The signal D/4 is interleaved envelope-wise. For example, the p bits of the envelope EN1/1 emanate from the data source DQ1 whereas the marker bit K1 has been inserted in the region of the synchronizing device SS. Similarly, the p bits of the last envelope ENn/1 emanate from the last data source DQn and the marker bit has been inserted in the region of the synchronizing device SS.

Figure 3:
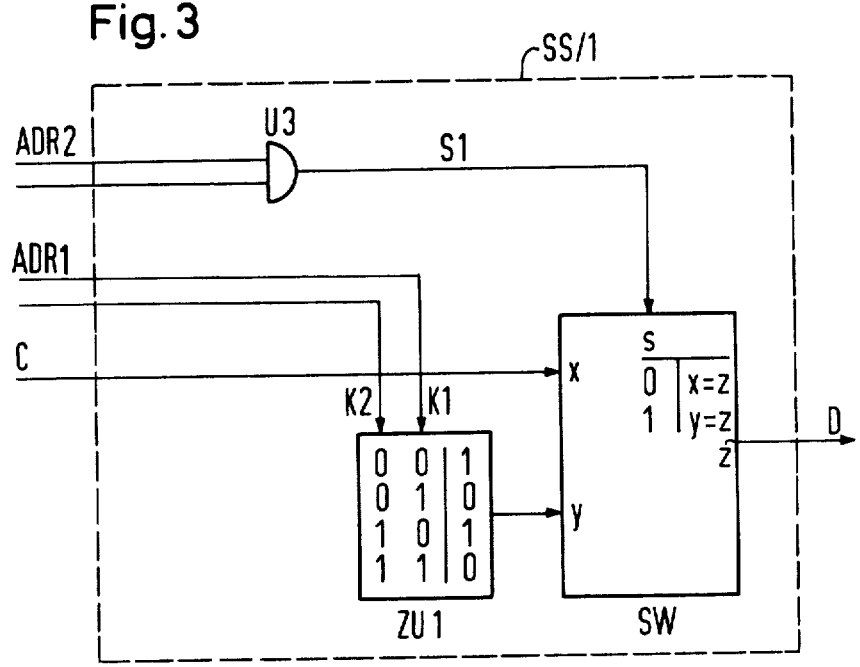
FIG. 3 illustrates an examplary embodiment of a synchronizing device at the transmitter.

All of the signals D/1, D/2, D/3 and D/4 shown in FIG. 3 contain a total of m marker bits K1, K2 ... Km per multiplex frame r. It will be assumed that not all of the m marker bits form one single synchronizing word as a whole, but that s marker bits form variable synchronizing words. In this case, s-1 consecutive marker bits are characterized by the fact that they also determine the next or the s-th marker bit so that when s-1 consecutive marker bits are known, it is possible to read the phase condition of these marker bits in the multiplex frame. This will be explained with reference to FIGS. 3 and 4.

Figure 4:
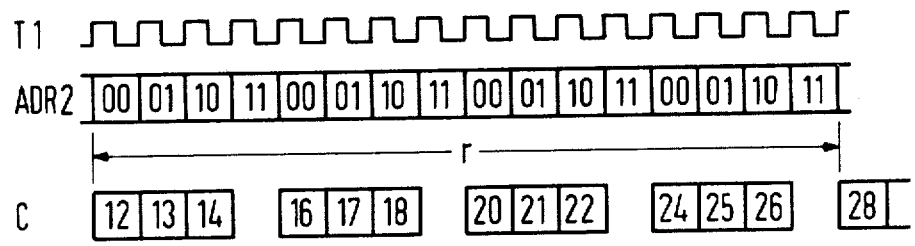
FIG. 4 illustrates a few addresses and signals relating to the synchronizing device illustrated in FIG. 3.
Figure 4:
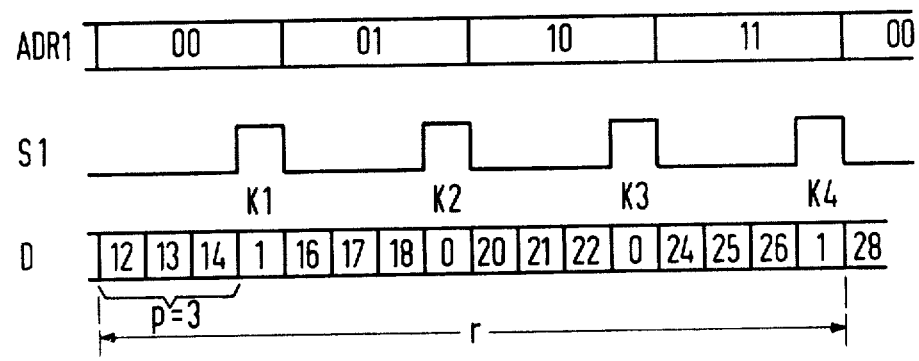

In FIG. 3, an exemplary embodiment of the synchronizing device SS of the transmitter is illustrated. Associated addresses and signals are illustrated in FIG. 4. It is assumed that in the signal D where p=3 following three bits 12, 13, 14 and 16, 17, 18 and 20, 21 and 22 and 24, 25, 26 there is inserted a marker bit K1, K2 and K3 and K4, respectively. The signal D illustrates the envelope-wise interleaving of these bits and to simplify the illustration the individual envelopes 12, 13, 14, K1 and 16, 17, 18, K2 and 20, 21, 22 and K3 and 24, 25, 26 and K4 have been formed merely from three data bits and one marker bit.

As seen in FIG. 3, the address ADR2 is fed to the AND-gate U3 and from its output there will occur the signals S1 which produces signals which indicate the intervals at which the marker bits must be inserted.

The allocator ZU1 receives the addresses ADR1 and in response thereupon emits the marker bits K1=1, K2=0, K3=0 and K4=1. Particularly, when the address ADR1=00 is present, the allocator ZU1 emits the marker bit K1=1. The switch SW inserts the marker bits into the signal C. The signal S1 serves as a control signal and is fed to the input s of the switch SW and the signal C is present at the x input and the output signal of the allocator ZU1 is supplied to the input y of the switch SW.

Depending upon the signal S1=0, the signal C and in the presence of the signal S1=1, the output signal of the allocator ZU1 will be switched through to the output z so that the output signal D occurs. In the special circumstances, the signal D consists of a total of m=4 groups with m equal four marker bits of which s equals three consecutive marker bits form variable synchronizing words. In each case, s−1=2 consecutive marker bits clearly characterize the position of the marker bits in the t.d.m. frame r. When two consecutive marker bits signal the words 00, 01, 10 and 11 as is illustrated in the table for the allocator ZU1. These can only be the marker bits K2, K3 and K3, K4 and K1, K2 and K4, K1, respectively. This illustrates the principle that two consecutive marker bits determine the binary value of the next marker bits. For example, the two marker bits K1, K2=1,0 can only be followed by the marker bit K3=0. Similarly, the two marker bits K2, K3=0,0 can only be followed by the marker bit K4=1. A sequence of marker bits K1 . . . K4 of this type is referred to as quasi-random sequence or as scrambled sequence. The production of such a sequence of marker bits employing a scrambler is known. The allocator ZU1 illustrated in FIG. 3 can also be designated a scrambler.

Figure 5:
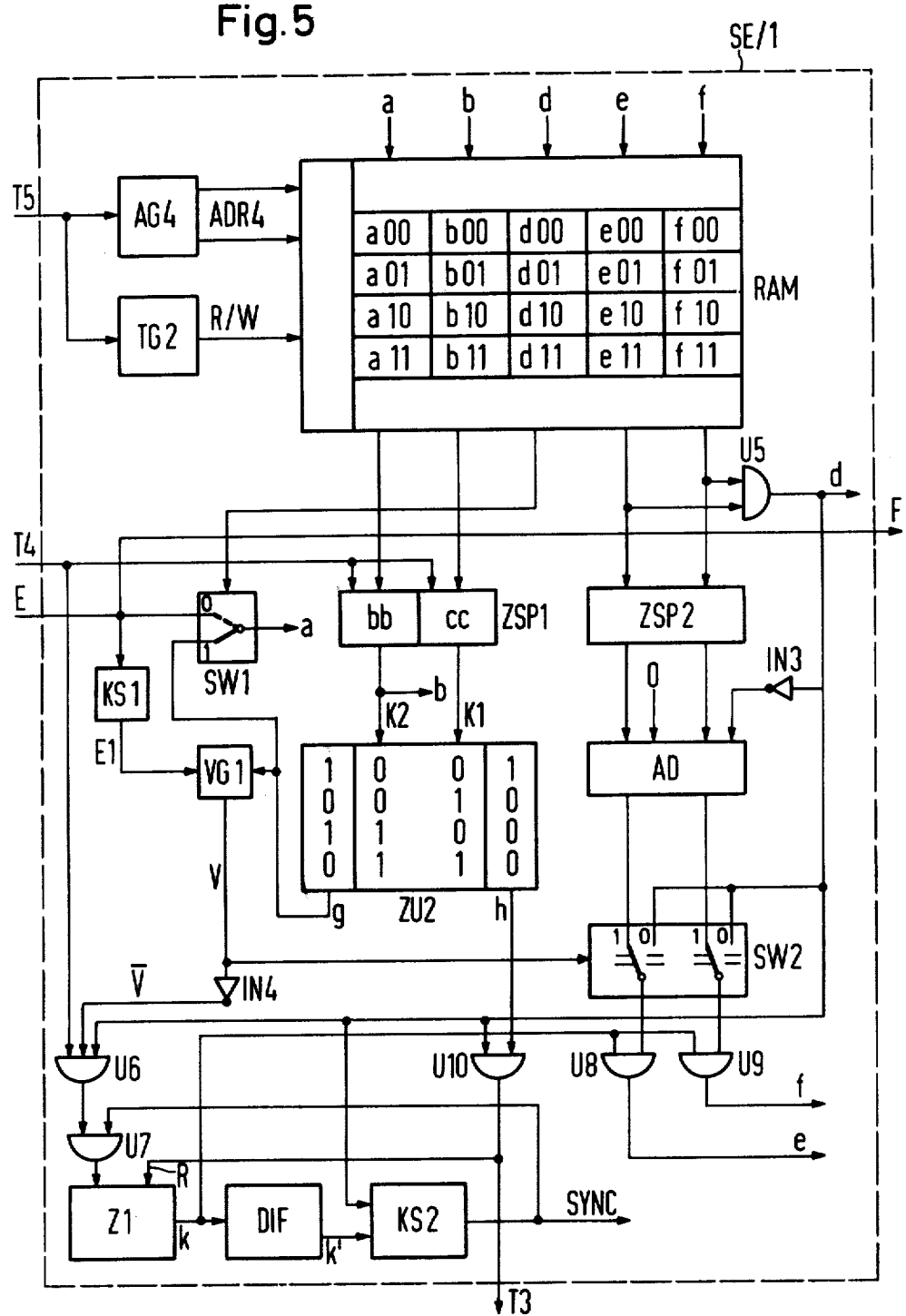
FIG. 5 illustrates an exemplary embodiment of a synchronizing device for the receiver.
Figure 6:
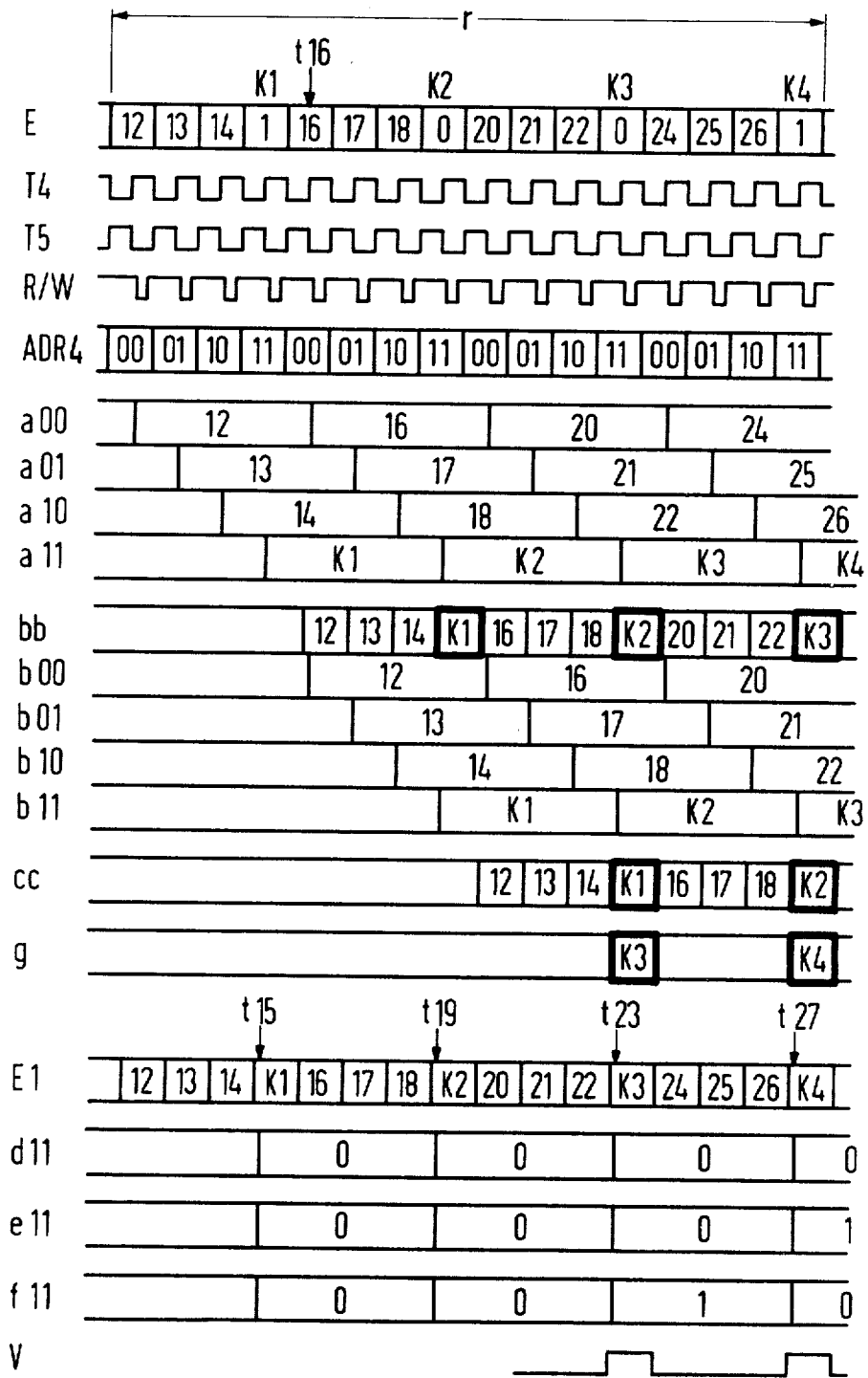
FIGS. 6 and 7 illustrate a few signals and addresses which occur in relationship to the synchronizing device illustrated in FIG. 5.
Figure 7:
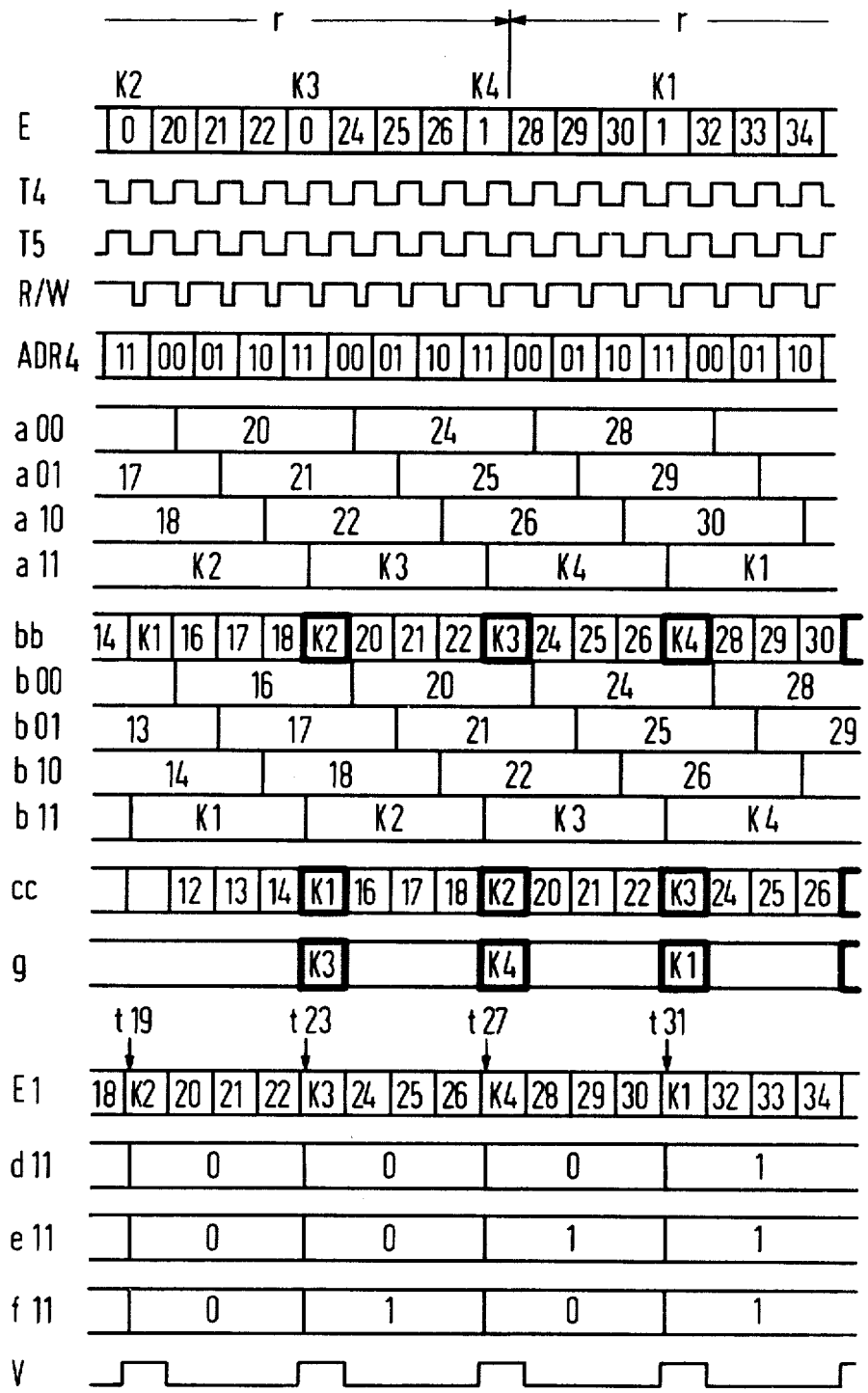

FIG. 5 illustrates an exemplary embodiment of the synchronizing device SE at the receiver such as shown in FIG. 1 and FIGS. 6 and 7 illustrate associated addresses and signals. The t.d.m. signal E corresponds to the t.d.m. signal D illustrated in FIG. 4. Thus, in respect to each t.d.m. frame r, are contained a total of four marker bits K1, K2, K3, K4 of which three in each case form variable synchronizing words. The timing signals T4 and T3 are produced by the pulse generator TG1 illustrated in FIG. 1 and determine the center and beginning of the individual bits by the pulse flanks. The pulse generator TG2 illustrated in FIG. 5 produces the signal R/W which operates the adjustable storage means RAM. Particularly, when R/W=1, data is read out from the storage means RAM and with R/W=0 data is written into the storage cells of the storage means RAM. The address generator AG4 produces addresses ADR4 which occur approximately simultaneously with the individual bits of the signal E. p+1 addresses will be produced. The addresses ADR4=00, 01, 10 and 11 always characterized the first, second, third and fourth bits respectively of each group of the t.d.m. signal E. The inputs a, b,d, e and f cause the signals to be written into the storage cells which are currently addressed by the address ADR4. For example, depending upon the signals R/W=0 with the address ADR4=00, the bit 12 is written into the storage cell a00. On the next call up of the address ADR4=00, the bit 16 is written in and then the bits 20 and 24. Similarly, the bits 13, 17, 21, 25 are written consecutively into the storage cell a01, the bits 14, 18, 22, 26 are written into the cell a10 and the marker bits K1, K2, K3, K4 are written into the storage cell a11. Thus, in this exemplary embodiment, it is assumed that the marker bits K1 to K4 occur during the addresses ADR4=11. However, this address allocation is entirely arbitrary and there is complete freedom as to which address ADR4 is assigned the marker bits.

The intermediate storage means ZSP1 has two storage cells bb and cc which are connected to the corresponding outputs of the storage means RAM. Upon the occurrence of the positive flank of the timing signal T4, the cells bb and cc are activated and those items of data from the storage mean RAM which are stored in address storage signals are transferred. For example, at the time t16 the address ADR4=00 and with the positive flank of pulse of signal T4 the bit 12 of the storage cell a00 will be transferred into storage cell bb. In a similar manner, all of the other bits are consecutively transferred into cell bb and then from the output of cell bb and by way of lines b written into the relevant addressed cell b00 or b01 or b10 or b11. For example, during the write-in phase of the signal R/W=0 after the time t16 with the address ADR4=00, bit 12 of cell bb is transferred into cell b00. The bits 16 and 20 then follow in the same manner. Similarly, bits 13, 17 and 21 are written into cell b01 and the bits 14, 18 and 22 are written into cell b10 and bits K1, K2, and K3 are written into cell b11. Upon the occurrence of the positive going flank of the pulse of signal T4, data is transferred from cells b00 through b11 into cell cc so that the illustrated bit sequence is produced which has been delayed by p+1=4 bits in relationship to the bit sequence stored in cell bb. Thus, bits 12 and 16, 13 and 17, 14 and 18, K1 and K2, 16 and 20 . . . are emitted from the outputs of the cells cc, bb, however, initially, no knowledge of which of these bit combinations relate to the marker bits is known.

In the event that marker bits are present at the input, the allocator ZU2 is used to establish the following marker bit and the output signal g from the allocator ZU2 is identical to the output signal from the allocator ZU1 illustrated in FIG. 3. Thus, for example, if marker bits K1, K2=10 are emitted from the two cells cc and bb, the allocator ZU2 emits the signal g=K3=0. In the case when marker bits K2, K3=00 are supplied to the input, the allocator ZU2 emits the signal g=K4=1. Thus, when s=3 a total of s−1=2 marker bits are considered and taken into account in cells cc, bb from which the s-th bit is determined with the use of the allocator ZU2 and emitted as a signal g to the comparator VG1. By the use of the trigger stage KS1, the t.d.m. signal E is delayed by one-half a bit so that the delayed t.d.m. signal E1 is produced which is also supplied to the comparator VG1. Particularly, at the time t23 the signals g=K3 and E1=K3 are compared with one another in the comparator VG1 and because of the identity of these two signals K3=0, an identity pulse V=1 is emitted from the output of the comparator VG1. The allocator ZU2 and the comparator VG1 at time 23 cause the synchronizing word composed of marker bits K1, K2 and K3 to be recognized and the corresponding identifying pulse V=1 is emitted.

FIG. 7 illustrates the same addresses and signals as those illustrated in FIG. 6 at a somewhat later time. Particularly, it can be observed that also at time t27 and t31 identity is established between the marker bits K4 and the marker bits K1 and that the appropriate identifying pulses V=1 will be emitted.

The intermediate storage means ZSP2, the adder AD, the switch SW2, the inverter IN3 and the AND-gates U5, U8 and U9 as well as the storage cells e00 through e11 and f00 through f11 form portions of a counting device which counts the identity pulses V=1 separately according to the addresses ADR4. The mode of operation of this counting device will be explained with reference to Table 1 which follows, however, only the procedures relating to the address ADR4=11 will be described. It is assumed that at time T19, the word 00 is stored in the intermediate storage means ZAP2 that the word 01 is emitted from the output of the adder AD and that the switch SW2 is in its 0 position. Further, it is assumed that with signal K=1 a non-synchronous state exists and that the word 00 is stored in the storage cells e11 and f11. Under these assumptions, the gate U5 will emit the switching signal d=0 so that the inverter IN3 will emit a one signal and with the aid of the adder AD the word 00 from the intermediate storage means ZAP2 and the word 01 will be added together producing the word 01 as a result. When the switch SW2 moves to its 0 position with the signal V=0 with the switching signal d=0, the gates U8 and U9 will be blocked so that the zero signals are written into the storage cells e11 and f11 by way of line e and f.

Table 1

|     | ZSP2 | AD | SW2 | e11 | f11 | k | d | KS2 | SW1 |
| --- | --- | --- | --- | --- | --- | --- | --- | --- | --- |
| t19 | 0 | 0 | 0 | 1 | 0 | 0 | 0 | 1 | 0 | 0 |
| t23 | 0 | 0 | 0 | 1 | 1 | 0 | 1 | 1 | 0 | 0 |
| t27 | 0 | 1 | 1 | 0 | 1 | 1 | 0 | 1 | 0 | 0 |
| t31 | 1 | 0 | 1 | 1 | 1 | 1 | 1 | 1 | 1 | 1 |

At time t23 an identifying pulse B=1 is emitted so that the switch SW2 will assume its 1 switching position. The result 01 is again emitted from the output of the adder AD and the word 01 is written into the storage cells e11 and f11 by way of switch SW2 and through gates U8 and U9 of lines e and f. At time t27, identifying pulse V=1 again appears and the adder adds the words 01 and 01 and emits the result 10 which is again written into the storage cells e11 and f11. At time t31, an identifying pulse V=1 again appears and the adder adds the words 10 and 01 and emits the result 11 which is written into the storage cells e11 and f11. Prior to this time, the switching signal d=1 has been continuously emitted by the gate U5 and transferred into the storage cell d11 so that the switch SW1 constantly occupies its 0 position and the t.d.m. signal E is supplied by way of line a to the storage cell a11 for the duration of this non-synchronous state. However, at the time t31 the counting device will have reached its maximum count of 11 so that the switching signal d=1 is emitted and written into the storage cell d11. Upon the occurrence of the switching signal d=1, the synchronous state is accomplished and the switch SW1 will be put into its 1 position during which it provides the signal g into the storage cell by way of line a. As long as the synchronous state exists, the marker bits are no longer removed from the received t.d.m. signal e but from the allocator ZU2. Since the frame synchronization has been accomplished, it is assumed that the marker bits obtained with the aid of the storage cells a0 through a11, b0 through b11 and with the storage cells bb, cc and the allocator ZU2, the components of the signal g will be subjected to less disturbance than the marker bits of the received t.d.m. signal E. Thus, in spite of any disturbed marker bits in the signal E, the frame synchronization will be maintained. On the other hand, the gate U10 is activated with the switching signal d=1 such that together with the signal h from the allocator ZU2, frame synchronization signal T3 will be produced. In the production of the signal h in accordance with the illustrated Table 1, the allocator operates such that it emits the signal h=1 only when the signals 00 are present at the two inputs so that the beginning of the t.d.m. frame is established approximately at the time t27 with the signals K2, K3=00.

As long as the synchronous state is retained, the inverter IN4 is used to obtain the $\overline{V}$ which is complimentary to the identity signal V and which signals indicate incorrect identities. The AND-gate U6 emits a pulse only when 1 values of the signals T4, $\overline{V}$ and d coincide so that such signals of the gate U6 relate only to the address ADR4 which is allocated to the marker bits. Thus, in this example, these output pulses relate to the address ADR4=11. When the AND-gate U7 is also conductive, the counter Z1 continuously counts the pulses $\overline{V}$ and continuously emits the signals k=1 so long as it has not reached a given count. With a relatively small number of pulses, $\overline{V}$ the gates U8 and U9 are thus conductive so that when the signal d=1 1-signals are emitted by way of switch SW2 even when with a pulse V=0, the switch SW2 can be brought into its 0 position. When the identity pulse V=1 occurs, the switch SW2 remains in its position illustrated in the drawing and as the adder AD constantly adds the numbers 11 and 00 with the switching signal d=1 and produces the result 11, the word 11 remains stored in the storage cells e11, f11 and the switching signal d=1 is emitted.

The situation changes, however, when the counter Z1 reaches its given count and then emits the signal k=0 which introduces the non-synchronous state. With the signal k=0, the gates U8, U9 are blocked so that the words 00 is written into the storage cells e11, f11 by way of lines e and f and with the switching signals d=0, the storage cell d11 also stores a 0 signal as the result of which the switch SW1 reassumes its 0 position and the t.d.m. signal E is fed by way of lines a to the storage cell a11. Thus, the non-synchronous state is again reached and if the comparator VG1 again emits a plurality of identity pulses V=1 the counting device with the adder is caused to count upwards again as has been indicated with reference to Table 1.

The counter Z1 is reset by way of the resetting input R by the frame synchronizing signal T3 so that the counter Z1 records only those faulty identities which are signalled from the beginning of the individual t.d.m. frames with the aid of the pulses $\overline{V}$.

It is often times desirable to identify the synchronous and non-synchronous state with a binary output signals for example, for actuating an alarm device. The trigger stage KS2 emits the signal SYNC which indicates the synchronous state condition by SYNC=1 and the non-synchronous state when SYNC=0. With the differentiator stage DIF, the signal k' is obtained which indicates the pulse flanks of the signal K with a relatively short pulse. Thus, when a change occurs in the binary values of the signal k, a pulse of short duration is always emitted to the trigger stage KS2 in response to the signal k' and when the switching signal d=1 or d=2 is present at the other input of trigger stage KS2, the signal SYNC=1 or SYNC=0 respectively, will be admitted at the output of the trigger stage KS2. The signal SYNC=1 is also used to feed counting pulses to the counter Z1 through the AND-gate U7 only during the synchronous state. Thus, the counter Z1 only operates for the duration of the synchronous state and during the duration of the non-synchronous state when the signal SYNC=0 the counter Z1 does not receive any counting pulses. In this manner, the gates U8 and U9 are prevented from being blocked during the non-synchronous state.

The description given relative to the counting device and the adder AD has fundamentally dealt only with the processes which occur during the address ADR4=11. Before the synchronous state is achieved it is of course arbitrary which of the addresses ADR2 are assigned to the marker bits. If this were not so, t.d.m. frame synchronization would not be required. Thus, the counting device with the adder AD1 may also count upwards during other addresses and in fact whenever the comparator VG1 randomly emits an identity pulse V=1. Thus, the storage cells e00, f00 and e01, f01 and e10, f10 and e11, f11 continuously store generally differing counts although the maximum count of 11 is only achieved when several identity pulses V1 are consecutively fed to the switch SW2. If only one single pulse V=0 occurs during the non-synchronous state, the switch SW2 is brought into its 0 position, and as the switching signal d=0 indicates the non-synchronous state, the word 00 is written into the particular address storage cells by way of the lines e and f and, thus, the count of the counting device is reset to the initial count.

FIGS. 4, 5 and 6 illustrate an exemplary embodiment in which so as to simplify the representation there has been assumed that there are only three data sources with n=3 and four marker bits per false pulse frame r with m=4 and variable synchronizing words each consisting of three marker bits with s=3. In a practical exemplary embodiment, there are provided 80 data sources which emit data envelopes so that at the transmitting end a t.d.m. signal is produced which fundamentally conforms with the t.d.m. signal D/4 illustrated in FIG. 2. Therefore with m=80, the transmitting ends t.d.m. signal contains a total of eighty marker bits of which eight marker bits in each case form the variable synchronizing words. Thus, with s=8 and s−1=7 consecutive marker bits, the eighth marker bit is determined at the receiver with the aid of the allocator ZU2 and in the comparator VG1 where this eighth marker bit is compared with the corresponding bit of the t.d.m. signal E1. In this exemplary embodiment, the counting device including the adder AD is in each caused to count up to the maximum count of 111.

If at the receiver alignment bits A are again inserted in place of the marker bits K1 through Kn the signal F consists of consecutive data envelopes which each comprise one alignment bit, a few data bits and one status bit. The addresses ADR3 are then emitted in such a manner that the individual data envelopes are in turn fed to the data sinks DS1 through DSn. When the signal F is identical to the signal E as illustrated in FIG. 6, the addresses ADR3 are emitted in such a manner that the bits 12, 13 and 14 are fed in turn to the data sinks DS1, DS2 and DS3 and the marker bits K1, K2 and K3 will not be forwarded.

The address generator AG3 can be synchronized either with the signal T3 or with a further address signal which sets the address generator AG3 to the correct position depending upon the relevant synchronizing word.

Although the invention has been described with respect to preferred embodiments thereof, it is not to be so limited as changes and modifications may be made therein which are within the full intended scope of the invention as defined by the appended claims.

We claim as our invention:

1. A process for t.d.m. frame synchronization at a receiver employing variable synchronizing words, and in which at the transmitter there is produced a t.d.m. signal which consists of groups each comprising p bits and one marker bit and, each multiplex frame contains a total of m marker bits of which in each case s marker bits form the synchronizing words and, at the transmitter s−1 marker bits determine the following s-th marker bit, and the t.d.m. signal is transmitted to the receiver and stored in a storage means wherein p+1 addresses are produced which are periodically assigned to the p bits and marker bits of each group, and at the receiver for each address the s-th bit is obtained from s−1 bits, which is stored in the storage means with the t.d.m. signal and compared with the corresponding received bit of the t.d.m. signal, and in the event an identity occurs an identity pulse is produced and consecutive identity pulses having a like address are counted and depending upon the counting result, a frame synchronizing signal is produced with the aid of which the receiver t.d.m. frame is set up, characterized in that in the non-synchronous state the received t.d.m. signal (E) is fed to the storage means (RAM), and when synchronism has been achieved the pulses (V) which occur during the addresses of the marker bits and are complementary to the identity pulses ($\overline{V}$) are produced and in place of the t.d.m. signal (E) the s-th bits obtained at the receiving end are fed to the storage means (RAM) as long as the number of complementary pulses ($\overline{V}$) per multiplex frame is smaller than a given number, and that the furnishing of the t.d.m. signal (E) to the storage means is reintroduced when, in the synchronous state, the number of complementary pulses ($\overline{V}$) per multiplex frame (r) is greater than said given number.

2. A process as claimed in claim 1, characterized in that the given number per multiplex frame (r) amounts to at least m/20 and preferably m/10 where m is the number of bits per t.d.m. frame.

3. Apparatus for t.d.m. synchronization comprising, a receiver, a first pulse generator at the receiver which produces a bit pulse train, a demultiplexer, a first address generator which produces demultiplex addresses for controlling said demultiplexer receiving an input from said first pulse generator, a receiving-end synchronizing device connected to said demultiplexer and which triggers the variable synchronizing words and resets the first address generator at the beginning of the t.d.m. frames, a plurality of buffer storage means which receives the output of said synchronizing device and which are controlled by said demultiplexer and data sinks connected to said buffer storage means and individual bits of the t.d.m. signal are fed to corresponding data sinks, said receiver synchronizing device (SE) contains a second address generator (AG4) which produces p+1 addresses (ADR4) which occur approximately simultaneously with individual bits of the t.d.m. signal (E), said synchronizing device (SE) contains an addressable store (RAM) having p+1 storage blocks, the first storage cells of which can be connected by way of a first input and a second output, and the other storage cells of which can be connected by further inputs and further outputs, a second pulse generator (TG2) is provided which during the individual bits of the t.d.m. signal (E) produces a binary read/write signal (R/W) which, in respect of each bits, establishes a write-in phase and a read-out phase of the storage means (RAM), an intermediate store (ZSP1) is provided whose storage cells (bb, cc) are connected to the further outputs of the addressable storage means (RAM), an allocator (ZU2) is provided which at its input is connected to the storage cells (bb, cc) of the intermediate storage means (ZSP1) and which emits the s-th bit depending upon the s-1 bits of the t.d.m. signal (E), a switch (SW1) is provided which depending upon a switching signal (d), supplies the t.d.m. signal (E) in a first switching position and the s-th bit of the allocator (ZU2) in a second switching position to the first input of said addressable storage means (RAM), the identity pulses (V) are produced with the aid of a comparator (VG1) which at its input is fed with one bit of the received t.d.m. signal (E1) and with the s-th bit, a first counting device (ZSP2, AD, SW2, e00 to 311, f00 to f11) is provided which, in respect of each address, counts the number of identify pulses (V) and depending upon a count emits the switching signal (d) which triggers the frame synchronizing signal (DT3), and a second counting device (Z1, U6, U7) is provided which, in the synchronous state, is supplied with the complementary pulses ($\overline{V}$) and which emits a blocking signal (k) which blocks the first counting device when the given number is exceeded.

4. A circuit arrangement according to claim 3, characterized in that the allocator (ZU2) produces a second output which causes a marker bit signal (h) to be emitted whenever a marker bit combination signalling the beginning of the multiplex frame (r) is present at the inputs of the allocator, and an AND-gate (U10) is provided which is supplied at its input with the marker bit signal (h) and the switching signal (d) and which emits the frame synchronizing signal (T3).

* * * * *